Nov. 4, 1969   J. A. FORTENBERRY   3,476,468
NOSEPIECE FOR ROCKING CONNECTION TO OPHTHALMIC MOUNTING
Filed Aug. 26, 1966
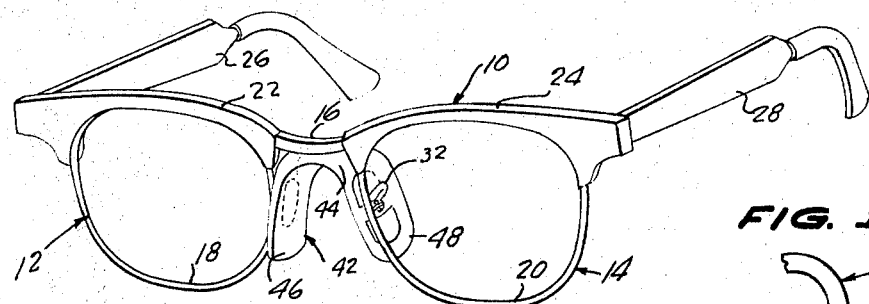
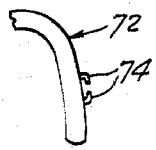
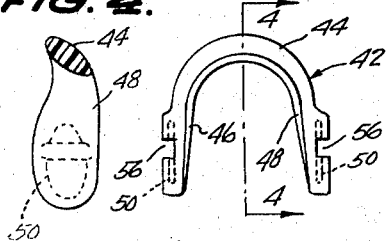
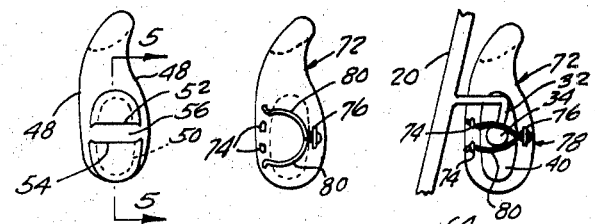
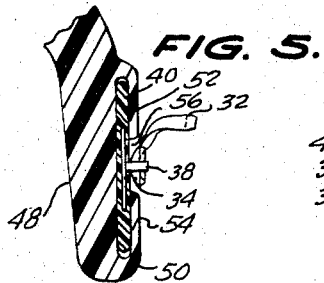
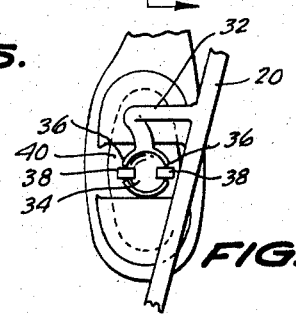
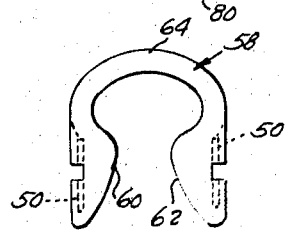
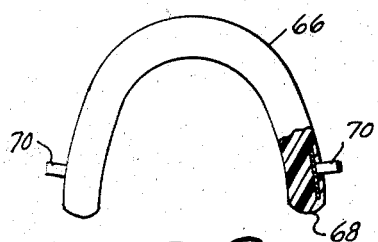
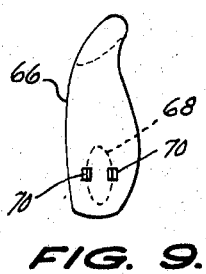
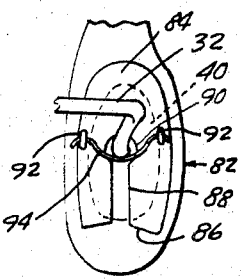
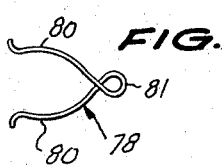
INVENTOR.
JERRY A. FORTENBERRY,
BY
Berman, Davidson & Berman
ATTORNEYS.

United States Patent Office 3,476,468
Patented Nov. 4, 1969

3,476,468
NOSEPIECE FOR ROCKING CONNECTION TO OPHTHALMIC MOUNTING
Jerry A. Fortenberry, P.O. Box 308, Columbia, Miss. 39421
Filed Aug. 26, 1966, Ser. No. 575,450
Int. Cl. G02c 5/12
U.S. Cl. 351—130                                6 Claims

ABSTRACT OF THE DISCLOSURE

A saddle member having an inverted U-shape with an arched upper portion for engaging the bridge area of the nose of a wearer and spaced depending arms for engaging the sides of the nose is attached to the rocking nose pads of eyeglasses by clamping means on the outer surfaces of each of said saddle depending arms operative to releasably secure said saddle member to the corresponding one of said rocking pads in such manner that the saddle member may rock slightly in all directions about the semisphere portion of the rocking pad connection.

---

This invention relates to nosepieces for ophthalmic mountings and more particularly to an improved nosepiece which may be temporarily or permanently mounted on an eyeglass frame by securement to the rocking nose pads or their connections.

The most natural and comfortable way to support an ophthalmic mounting is to provide a saddle-like nosepiece which, when properly fitted, will rest on the less sensitive bridge area of the wearer's nose and thus support the bulk of the weight of the mounting without requiring more than the general engagement at the side of the nose and no more than a light rearward pull on the temples to hold the mounting securely in place. For the most part, however, the use of saddle-type nosepieces has been avoided because their effectiveness depends entirely upon proper fitting both at the bridge of the nose and at the sides thereof with the costly result of making necessary the provision of a multitude of different nosepiece sizes and contours to meet the facial dimensions of the wearing public.

Attempts to provide nosepieces which are adjustable to different nose sizes and shapes have resulted in the development of various intricate and expensive ball and socket type connections for attaching relatively rigid nosepieces to the nasal area of the eyeglass frames. These arrangements usually embody nosepieces which engage substantially only the bridge area of the nose and rely entirely on this area to secure the frame against lateral misalignment as well as downward slippage. Such nosepieces do not offer the secureness and comfort of the saddle type nosepiece which has side portions extending downwardly to engage the nose below the bridge area while being simultaneously in engagement with the top or less sensitive bridge portion of the nose to support the bulk of the weight of the frame.

The primary object of the present invention is to provide a saddle of plastic, or other material, which may be temporarily, or permanently, attached to the nose pads of an ophthalmic frame, or to their connections, so as to add comfort to the wearer while improving the appearance of the frame.

An important object of the invention is to form a saddle type nosepiece of flexible, or at least semi-flexible, material so that the downturned arms thereof may be easily adjusted toward and away from each other and twisted about their vertical axes so as to fit the contour of the nose of any wearer.

Another object of the invention is to provide a saddle type nosepiece having the above-described characteristics and provided with pockets on the downturned arms to receive the existing rocking nose pads of an ophthalmic frame whereby the slight rocking movements of the nose pads are imparted to the nosepiece to adjust it to the nose of the wearer when the spectacle frame is worn.

A further object of the invention is to provide an improved, self-adjusting, nosepiece structure which is readily adaptable to all types of ophthalmic mountings, or goggles, and which is uniquely simple and inexpensive to manufacture, and provides optimum comfort and secureness of fit upon the nose of a wearer.

A further object of the invention is to provide an improved nosepiece, having the foregoing characteristics, which may be quickly and easily attached, or detached, and which is adapted to fit a wide range of sizes of spectacle frames and to provide a secure fit to the wearer with any of said frames of different size.

Still another object of the invention is to provide an improved nosepiece, having the above-described characteristics, which may be readily attached or detached even by a person unskilled with respect to ophthalmic mountings, and which requires no special tools in order to permanently, or temporarily, attach the nosepiece.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts through the several figures and in which:

FIGURE 1 is a perspective view of a conventional ophthalmic frame having a nosepiece according to the invention secured to the rocking nose pads thereof;

FIGURES 2 and 3 are front and side elevations respectively of the nosepiece shown in FIGURE 1;

FIGURE 4 is a sectional view taken on line 4—4 of FIGURE 2, looking in the direction of the arrows;

FIGURE 5 is an enlarged, fragmentary, sectional view taken on line 5—5 of FIGURE 3 and showing a rocking nose pad (and its connection to the ophthalmic mounting) clamped in a pocket of the nosepiece;

FIGURE 6 is a side elevational view of the fragment of nosepiece and the rocking pad shown in FIGURE 5;

FIGURE 7 is a front elevational view similar to FIGURE 2, but of another embodiment of the invention;

FIGURES 8 and 9 are enlarged, front and side elevations, similar to FIGURES 2 and 3, of still another embodiment of the invention;

FIGURE 10 is a plan view of a spring clamping element;

FIGURE 11 is a side elevation of a modified nosepiece incorporating the clamping element of FIGURE 10;

FIGURE 12 is a side elevation similar to FIGURE 11, but adding a rocking nose pad and its connection clamped to the nosepiece of FIGURE 11;

FIGURE 13 is a fragmentary, front elevational view of the nosepiece of FIGURE 11; and FIGURE 14 is a fragmentary side elevation, similar to FIGURE 6, but of still another modified nosepiece.

Referring more particularly to the drawings, there is shown in FIGURE 1 an ophthalmic mounting 10 comprising a pair of right and left eye lens supporting sections 12 and 14, respectively, joined together by a structural supporting bridge 16. The sections 12 and 14 each embody a grooved eye wire, 18 or 20, which in a conventional manner of construction is adapted to surround the edge of a lens clamped in place therein. The eye wires are fitted into brow sections, 22 and 24, usually of plastic or metal, which extend from the nasal areas thereof so as to terminate at the temporal sides of the mounting 10. Adjacent their termination, the brow sections 22 and 24 each carry a temple, 26 and 28 respectively, which is pivotally connected thereto and extends rearwardly of the mounting 10 for the purpose of engaging the head of a wearer by extending over and behind, or dajacent, the area of the ears. Each eye wire 19, 20 has attached thereto in the area adjacent the nasal portion a rocking pad connection 32 of conventional type which is soldered or otherwise secured at one end to the eye wire and has its other end looped and downturned to terminate in a slightly concave attachment disc 34, or semisphere, best shown in FIGURE 6, having a pair of diametrically opposed notches 36 for reception of the inturned tabs 38 of a conventional nose pad 40. The disc 34, notches 36 and tabs 38 provide a conventional mounting which permits small oscillations of the nose pad 40 in all directions. As thus far described, the ophthalmic mounting 10, or eye glass frame, is conventional in construction.

FIGURES 1–6 illustrate a preferred embodiment of the improved nosepiece according to the invention. The nosepiece 42 is of the saddle type, being more or less an inverted-U having an arched upper portion 44 and a pair of downwardly extending legs 46 and 48 which are the nose-engaging portions of the saddle. Each leg 46, 48 has integrally formed in its outer surface a pocket 50 defined by the upper and lower lips 52, 54 and a central mouth 56 as best seen in FIGURES 3 and 5. The pocket 50 is intended to receive and clamp a conventional rocking pad 40, FIGURES 5 and 6.

Although the saddle may be formed of a rigid material, it is preferably formed of a flexible plastic, resin, metal, or metal molded within a plastic or rubber material so that the saddle may be bent or shaped, at room temperature without application of heat. A preferred plastic is a cellulose acetate such as is commonly used in ophthalmic mountings and which, before aging imparts brittleness, is sufficiently pliable at normal temperatures. Other suitable plastics include butyrates, polycarbonates, and polyvinyl chloride resins such as marketed by B. F. Goodrich Co. under the tradename, Koroseal.

When the saddle is formed of one of the above-named flexible materials, the arms 46 and 48 may be spread apart or pushed toward each other to better fit the width of the nose of a wearer. In addition, the rear edges of the arms 46 and 48 may be spread, or pushed together, or the forward edges may be likewise moved for in effect twisting the saddle to better fit the contour of the nose of the wearer. This flexibility of adjustment is aided by the adjustments possible between each connection 32 and the affixed nose pad 40, which tilt in all directions with respect to each other. A further adjustment is, of course, possible by applying thin nose pliers to the connections 32 and slightly bending them in any required direction to obtain the best possible fit.

To mount the nosepiece 42 on the ophthalmic frame 10, one arm, for example 48, is placed adjacent its respective nose pad 40 and the upper end, or the lower end of the nose pad is inserted through the mouth 56 into the pocket 50 and pushed home past lip 52. The other lip, for example 54, and the adjacent end of the arm 48 are then bent away from the nose pad so that the free end of the nose pad is received in the mouth 56, whereupon the lip and arm are bent back to enclose the nosepiece 40, as shown in FIGURE 5. The same steps are repeated for inserting a second nose pad in the pocket 50 of the second arm 46. In this manner, the saddle 42 is clamped to the nose pads of the conventional frame without direct attachment to the bridge 16, and is free for the minor adjustments of shape and position described above, due to the flexibility of the saddle 42 and its relation to the nose pad connection 32. The saddle provides a much more comfortable support for the frame 10, because of its area and shape, than the rocking pads 40 can provide. At the same time, the apperance of the frame 10 is enhanced by the addition of the nosepiece. When attached, the nosepiece may be worn as a permanent part of the frame 10, or it may be worn only temporarily if desired, being removed by first bending the lower portions of the arms 46 and 48 to unseat the lower portions of the rocking pads from the pockets 50 for removal through the pocket mouth 56. The nosepiece may then be lowered to remove the upper ends of the rocking pads 40 from the pockets 50. It is clear, therefore, that a wearer may easily apply, affix and adjust, as well as remove, the saddle-shaped nosepiece whenever desired without requiring special tools or the assistance of a specialist in frame adjustments, or repair.

A modified nosepiece 58 is illustrated in FIGURE 7 as being similarly provided with pockets 50 in the outer surfaces of its arms 60 and 62. The inner surfaces of arm 60, 62, however, curve inwardly and then outwardly to merge with the inner surface of the upper arch portion 64 so as to provide a keyhole opening between the named parts of the saddle. A saddle having this configuration is attached and detached to the rocking pads of the frame 10 in the same manner as described for the saddle 42, its keyhold shape, however, being better adapted to fit the contours of wearers having somewhat thinner noses.

FIGURES 8 and 9 illustrate a modified nosepiece in which the pockets 50 are omitted and a different means for clamping to the ophthalmic mounting is provided. Nosepiece 66 has molded in each of its arms, a small oval disc 68 having horizontally spaced tabs 70 which protrude from the outer surfaces of the saddle arms. These tabs 70 are comparable to the tabs 38, shown in FIGURE 6, which secure the rocking pads to a connection arm 32 of the ophthalmic frame. Hence, in applying the nosepiece 66 to a frame, the rocking pads 40 would be removed and the tabs 70 would be clamped in the notches 36 of the connection disc 34 on the arm 32 by turning the ends of the tabs 70 toward each other to overlie the disc 34. In this manner, the nosepiece is connected directly to the connection arm 32 and the rocking nose pads are omitted. This mode of fastening is more suitable for use by specialists in ophthalmic mountings than by unskilled purchasers, but results in an excellent fit of the nosepiece 66 which may oscillate slightly with respect to the connection arm so as to take a comfortable position on the nose of the wearer.

In FIGURES 10–13 is disclosed another modified saddle construction in which the pockets for receiving the rocking pads are omitted. Each arm of the saddle 72 is provided near one edge on its outer surface with a pair of vertically spaced hooks 74 and centrally thereof, but displaced rearwardly to a position near the other edge of the arm, is partially embedded a loop member 76. The clamping means on each arm further comprises a resilient member 78, see FIGURES 10 and 12, formed of spring wire and having a central loop 81 and a pair of crossed and divergent arms 80 terminating in short hooks. The loop portion 81 is fastened to its arm of the saddle member 72 by means of the embedded brad or loop 76, the arms 80 extending toward the spaced hook elements 74.

With this clamp construction a rocking pad 40 connected by its arm 32 to the eye wire 20 is merely laid against the outer surface of one of the arms of the saddle 72 with the disc connection member 34 positioned between the spread arms 80 of the spring member 78. The arms 80 may then be pressed toward each other, and under the hook elements 74, to fasten and hold the rocking pad 40 against the outer surface of the saddle arm. Of course, this procedure is repeated for the other arm of the saddle, and the saddle is thereby quickly and easily clamped to the rocking pads of the opthalmic frame 10.

To unclamp the saddle, it is merely necessary to slightly move the terminal hook ends of the spring clamps 80 toward each other sufficiently to clear the hook elements 74, whereupon the arms 80 are allowed to spread as in FIGURE 10, and the rocking pad 40 is released and may be removed.

FIGURE 14 illustrates a further modified embodiment of a nosepiece in which the pockets 50 of FIGURES 1 and 2 are altered in construction. The nosepiece 82 on each of the outer surfaces of the two arms is provided with an integral pocket formed by an integral wall member 84, whose mouth 86 is at the bottom of the pocket. The pocket wall 84 is slotted for a portion of its length, as shown at 86, the upper end of the slot being slightly enlarged in circular form as at 90. A pair of upwardly opening hook members 92 are provided near the front and rear edges of the wall 84 at the exterior thereof for reception of an S-shaped length of spring wire 94. The wire 94 acts as a retaining clamp for the connection 32 of the rocking pad of the spectacle frame. To clamp the nosepiece 82 to the rocking pads 40 it is merely necessary to slide the rocking pads 40 upwardly through the bottom opening mouths 86 of the pockets defined by the walls 84, the connection 32 moving upwardly through the wall slots 88 until the rocking pad connection seats against the upper edge of the circular enlargement 90 of the slot 88. While this would normally retain the rocking pad clamp to the nosepiece, certain pressures during wear might tend to unseat the nose pad downwardly from the pocket. Therefore, the spring clamp, or wire 94, is positioned under the connection arm 32, with its ends over the hooks 92, to latch the rocking pad and its connection arm to the nosepiece. Of course, to remove the nosepiece, it is merely necessary to unhook the ends of the spring wire 94 which then permits the rocking pads to be slid downwardly out of the pockets on the nosepiece.

Although certain specific embodiments of the invention have been shown and described, it is obvious that many modifications thereof are possible. The invention, therefore, is not to be restricted to the illustrated embodiments, but is deemed to include reasonable equivalents.

What is claimed is:

1. A readily attachable and detachable nosepiece for improving the comfort and appearance of an ophthalmic mounting of the type including a pair of spaced lens holding sections interconnected by a bridge, and a pair of rocking pads and their support connections, said connections each having an arm attached at one end to one of said lens holding sections and having its other end terminating in a semisphere swivelly secured to one of said pads, comprising a saddle member having an inverted U-shape with an arched upper portion for engaging the bridge area of the nose of the wearer and spaced depending arms for engaging the sides of a nose, and clamping means on the outer surfaces of each of said depending arms operative to releasably secure said saddle member to the corresponding rocking pad of an ophthalmic mounting in such manner that the saddle member may rock slightly in all directions about the semisphere forming part of the pad support conection.

2. A nosepiece according to claim 1, wherein said saddle member is formed of a flexible material, whereby to permit said depending arms to be spread apart and pushed toward one another for adjustment of the saddle member to fit noses of different sizes.

3. A nosepiece according to claim 2, wherein said clamping means comprises a pocket formed in the lower portion of each of said depending arms and having a centrally disposed mouth opening for insertion of one end of a rocking pad, each arm being bendable to receive the other end of the rocking pad and thereby permit entry of the entire rocking pad in its respective pocket upon bending back the arm of the saddle member to its normal nose-engaging position.

4. A nosepiece according to claim 3, wherein each of said central mouth openings extends the full width of its pocket and hence the full width of the rocking pad to be inserted therein, each of said mouth openings further having a vertical dimension sufficiently large to accommodate the semisphere of the rocking pad connection.

5. A nosepiece according to claim 2, wherein said clamping means comprises a pocket formed in the lower portion of each of said depending arms of the saddle member, said pockets being open at the bottom and each having an outer wall with a slot extending from the bottom vertically for a portion of the wall height and communicating with the interior of the pocket, the outer wall of each of said pockets being provided with a pair of laterally disposed hooks, one on each side of said slot, and a resiliet clamping member disposed below the upper end of said slot and having its ends engaged over said hooks, whereby a rocking pad may be inserted upwardly through the open bottom of each pocket, the rocking pad connection moving along said slot to the upper end thereof and said clamping member is stretched under the rocking pad connection so as to secure the rocking pad in the pocket and prevent downward release thereof without prior removal of the clamping member.

6. A nosepiece according to claim 1, wherein said clamping means comprises a pair of vertically spaced hooks mounted on the outer surface near one side of each of said depending arms of the saddle member, a support element disposed between said pair of hooks but offset laterally thereto and at the opposite side of said surface, and a clamp formed of spring wire having a central loop engaged by said support element and having diverging curved arms whose ends may be pressed toward each other to engage said first pair of hooks, whereby said clamp may be unhooked to permit placement of a rocking pad directly against the outer surface of the depending arm of the saddle member and clamped thereto by then pressing together the ends of curved clamp arms so as to engage under said pair of hooks, the diverging curved arms of the clamp encircling the rocking pad conection.

References Cited

UNITED STATES PATENTS

| | | | |
|---|---|---|---|
| 2,604,816 | 7/1952 | Waskiel | 351—137 |
| 3,233,956 | 2/1966 | De Angelis | 351—130 |
| 3,304,145 | 2/1967 | Hamm | 351—130 |

FOREIGN PATENTS 1,112,947 11/1955 France.

OTHER REFERENCES

Nos-Ease, Optical Journal-Review, p. 50, Aug. 15, 1963.

DAVID SCHONBERG, Primary Examiner

J. W. LEONARD, Assistant Examiner

U.S. Cl. X.R.

351—138